US006628458B1

(12) United States Patent
Brock

(10) Patent No.: US 6,628,458 B1
(45) Date of Patent: Sep. 30, 2003

(54) MICROSCOPE WITH IMPROVED CAMERA MOUNT AND ILLUMINATION SYSTEM

(75) Inventor: Dennis Brock, Winter Park, FL (US)

(73) Assignee: Brock Optical, Inc., Longwood, FL (US)

(*) Notice: Subject to any disclaimer, the term of this patent is extended or adjusted under 35 U.S.C. 154(b) by 959 days.

(21) Appl. No.: 08/892,903

(22) Filed: Jul. 14, 1997

(51) Int. Cl.⁷ .............................................. G02B 21/00
(52) U.S. Cl. ...................... 359/383; 359/368; 359/363
(58) Field of Search ................................ 359/368–369, 359/379–380, 382–383, 425–426, 694, 699–706, 823, 825–826

(56) References Cited

U.S. PATENT DOCUMENTS

| 739,182 A | 9/1903 | Ives ............................ 359/376 |
| 1,435,025 A | 11/1922 | Sommer ....................... 33/818 |
| 2,004,807 A | 6/1935 | Fassin ......................... 396/432 |
| 2,448,974 A | 9/1948 | Guttmann ..................... 359/383 |
| 2,489,487 A | 11/1949 | Gradisar et al. ............. 359/382 |
| 2,544,371 A | 3/1951 | Weiser ......................... 359/383 |
| 2,845,842 A | 8/1958 | Leitz et al. .................. 359/363 |
| 3,743,377 A | 7/1973 | Rosenberger ................ 359/379 |
| 3,764,193 A | 10/1973 | White ........................... 359/379 |
| 4,003,628 A | 1/1977 | Halperin ...................... 359/383 |
| 4,232,335 A | 11/1980 | Nakagawa et al. ........... 348/87 |
| 4,334,736 A | 6/1982 | Herbert ....................... 359/368 |
| 5,024,513 A | 6/1991 | Hayashi ....................... 359/379 |
| 5,071,241 A | 12/1991 | Brock .......................... 359/390 |
| 5,264,967 A | * 11/1993 | Marchlenski ............... 359/384 |
| 5,497,267 A | * 3/1996 | Ishikawa et al. ............ 359/380 |
| 5,768,033 A | 6/1998 | Brock .......................... 359/368 |

FOREIGN PATENT DOCUMENTS

| DE | 24 06 644 | 8/1975 | |
| DE | 32 36 562 | 4/1984 | |
| FR | 1274833 | * 9/1961 | ................ 359/379 |
| JP | 52-25653 | * 2/1977 | ................ 359/380 |

* cited by examiner

Primary Examiner—Thong Nguyen
(74) Attorney, Agent, or Firm—Caesar, Rivise, Bernstein, Cohen & Pokotilow, Ltd.

(57) ABSTRACT

An improved mounting apparatus for use in recording microscopic images with an image recording device, such as a camera or camcorder is provided. The apparatus is capable of readily aligning the optical axis of the image recording device and the optical axis of the microscope optical tube of the apparatus. Also provided are methods of using the device to observe, record and/or alter a specimen on which the apparatus is mounted. In addition, a microscope is provided which has simple but durable means for gross and fine focus adjustments. The microscope includes an optical tube for magnifying an image of a specimen to be viewed, and an optical tube sleeve in which the optical tube is rotatably and slideably retained. The optical tube includes a radial projection which is adapted to slide along the edge of the sleeve to grossly and finely adjust the focus of the microscope.

25 Claims, 3 Drawing Sheets

MICROSCOPE WITH IMPROVED CAMERA MOUNT AND ILLUMINATION SYSTEM

FIELD OF THE INVENTION

This invention relates to generally to microscopes, and more specifically to an image recording device mounting system and an illuminating system for microscopes.

BACKGROUND OF THE INVENTION

It is known in the prior art to provide attachment systems for permitting the taking of photographs through a microscope. Representative systems are disclosed in U.S. Pat. No. 2,845,842 to Leitz et al., and U.S. Pat. No. 2,004,807 to Fassin.

In the Leitz et al. system, the camera is secured to the upstanding neck of a microscope housing through a light-proof extension that is rotatably inserted in the upstanding neck. In the described embodiment, the camera is not secured to the ocular unit of the microscope, and the housing and the camera are not adjustable relative to each other.

In the Fassin device, a camera and microscope eyepiece are physically attached together as a single unit, to permit either element to be connected to a microscope tube through a solid connector. This connection does not permit relative linear movement between the camera and the microscope tube.

My previous U.S. Pat. No. 5,071,241, discloses a camera attachment system and an illuminating system for a microscope of the type having a stand, a stage attached to the stand for supporting a specimen to be photographed, an elongate optical tube carried by the stand and movable relative to the stand, said optical tube having an objective lens at a downstream end thereof adjacent the specimen and an eyepiece at an upstream thereof. The attachment system is characterized by a mounting-means for securing the camera to the stand of the microscope, with the camera upstream of the eyepiece of the optical tube and with the lens opening of the camera in axial alignment with the elongate optical tube. A conical adapter for providing a light shield between the lens opening of the camera and the optical tube includes an upstream end with means for securing the adapter about the lens opening of the camera to prevent the undesired ingress of ambient light, and a downstream end for closely surrounding the outer periphery of the optical tube to prevent the undesired ingress of ambient light while permitting relative movement between the optical tube and adapter in a direction along the elongate axis of the optical tube.

While my prior camera attachment system has been successfully employed by a large number of consumers over the last several years, there has been a need for an attachment system which is more readily adaptable to the wide variety of image recording systems available on the market.

There has also been a need for an economical apparatus that enables recording microscopic features of gross samples. In many cases, it is necessary or desirable to examine the desired samples in situ, rather than mounted on a microscope slide. For example, preparing mounted samples frequently requires the destruction of the product being analyzed, or at least entails the cost and delay of preparing the slides. Manufacturing costs would be minimized if a product could be analyzed without being altered or destroyed and without significantly delaying product distribution.

All references cited herein are incorporated herein by reference in their entireties.

SUMMARY OF THE INVENTION

The invention addresses at least the foregoing needs in providing an image recording device mounting apparatus for mounting an image recording device having an image recording device optical axis, said mounting apparatus comprising (1) an optical tube for magnifying an image of a specimen to be viewed, said optical tube having an optical tube optical axis along which said optical tube is selectively movable to alter said image; (2) an optical tube sleeve through which said optical tube moves and is slidably retained; (3) a lens platform for receiving (i.e., abutting or nearly abutting) a lens of said image recording device, said lens platform attached to an end of said optical tube furthest from said specimen; (4) a base for supporting said apparatus on said specimen, said base being attached to said optical tube sleeve; and (5) adjustable alignment means for selectively aligning said imaging device optical axis and said optical tube optical axis, said adjustable alignment means being attached to said base and removably attachable to said image recording device. The device can be compact, foldable and readily portable.

Also provided is a method for recording a microscopic image of a specimen, said method comprising mounting an image recording device in an apparatus according to the invention; mounting said apparatus on said specimen; and actuating said image recording device to record said microscopic image of said specimen. The image can be recorded and/or conveyed to an image display device for viewing.

The invention also provides a microscope comprising: an optical tube for magnifying an image of a specimen to be viewed, said optical tube having an optical tube optical axis along which said optical tube is selectively moveable to alter said image; an optical tube sleeve in which said optical tube is rotatably and slideably retained; wherein the optical tube sleeve includes an upper sloping surface and said optical tube includes a radial projection for overlying and engaging said sloping surface whereby rotatable motion imparted to the optical tube causes said optical tube to move axially along said optical tube optical axis through the cooperation of the sloping surface with the radial projection, and wherein said optical tube sleeve only partially encircles the optical tube and includes spaced-apart side edges defining a generally vertically oriented channel in said optical tube sleeve, said radial projection being dimensioned to slide within said channel along said optical tube optical axis when aligned therewith, whereby a gross focus adjustment can be made.

BRIEF DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like elements and wherein.

DETAILED DESCRIPTION OF PREFERRED EMBODIMENTS

Figure 1:
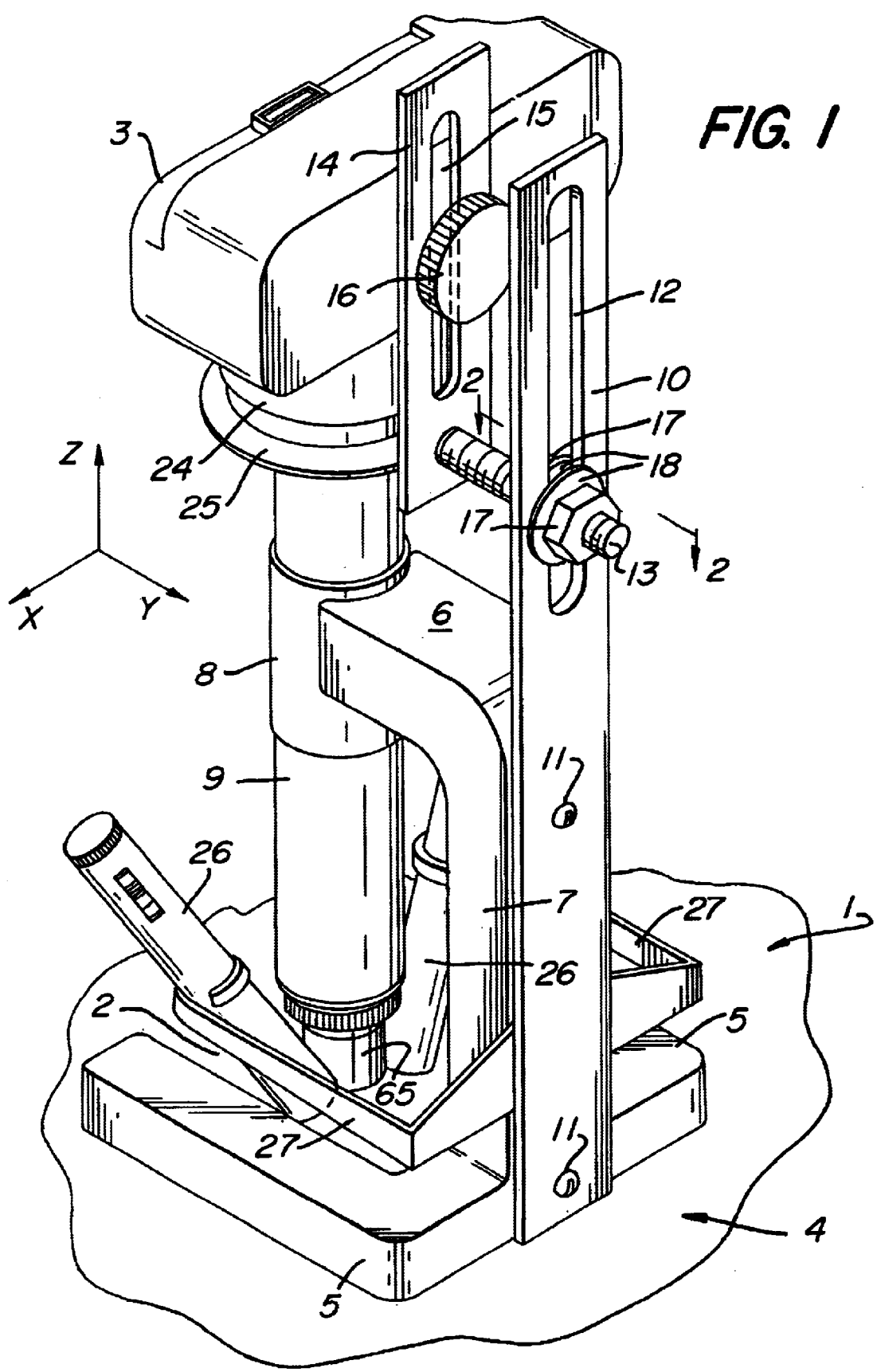
FIG. 1 is an isometric view of an embodiment of the present invention mounted on a specimen and having a camera mounted thereon.

Referring now in greater detail to the various figures, the mounting apparatus 1 is adapted for mounting on a specimen 2 while holding a image recording device 3. The image recording device 3 shown in FIG. 1 is a 35 mm camera; however, the invention is not particularly limited with respect to the types of image recording devices for which the apparatus 1 is suitable. It is preferred that the apparatus 1 be adapted to receive image recording devices that are mountable on conventional photographic tripods, particularly via standard size threaded mounting sockets provided in the image recording devices.

The mounting apparatus 1 has a base 4 for supporting the apparatus and image recording device above the specimen 2, or for maintaining the optical axis of the apparatus 1 substantially perpendicular to the surface of the specimen 2, when the specimen is non-horizontal, for example. FIG. 1 shows a base 4 including two feet 5 at the bottom and a head 6 at the top joined by a body 7.

The feet 5 are constructed so as to avoid obstructing the field of view of the image recording device 3. Because the feet 5 contact the specimen 2, it is advantageous in certain embodiments to modify the construction of the feet 5 to interact with the specimen 2 in a variety of ways. For example, it is advantageous in certain embodiments to provide the feet 5 with an ability to bind to the specimen 2, particularly for recording moving specimens or non-horizontal surfaces of specimens. This binding ability can be provided by, e.g., magnetic feet (not shown), suction cups on the feet (not shown) and the like. It is advantageous in certain embodiments to provide the feet with movement means (not shown), such as wheels, casters, treads or ball bearings, to facilitate smoothly gliding the apparatus 1 across the surface of the specimen 2.

The head 6 of the base 4 is attached to a cylindrical sleeve 8 through which an optical tube 9 passes and is slidably engaged. It is preferred that the cylindrical sleeve 8 provide sufficient frictional resistance against sliding movement by the optical tube 9 to prevent the optical tube 9 from sliding based solely on its own weight, but not so much resistance as to make it difficult for an operator of the apparatus to manually slide the optical tube 9.

Figure 3:
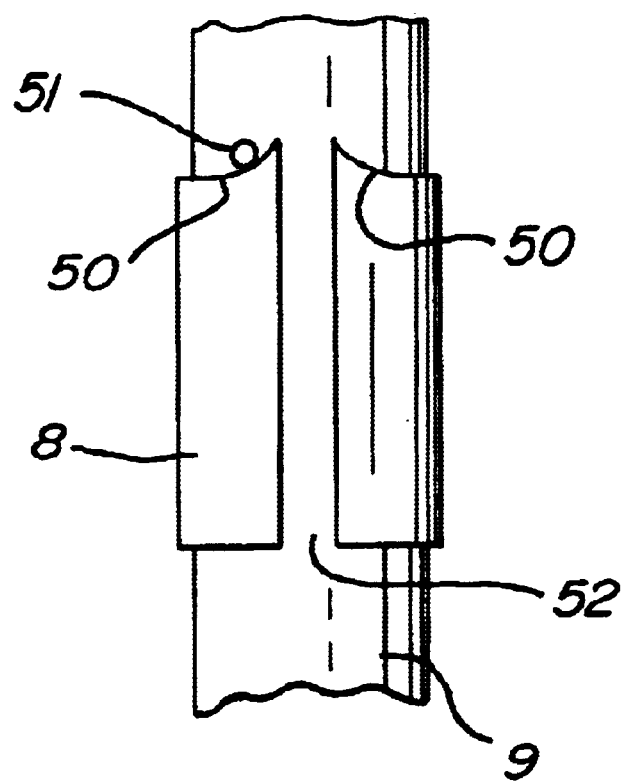
FIG. 3 is an enlarged view of a preferred focus adjusting means of the invention.

As shown in FIG. 3, it is preferred for the upper rim of the cylindrical sleeve 8 to have a slope 50, which works in combination with a rivet or nub 51 on the optical tube 9 to enable fine focus adjustment by rotating the optical tube 9 to cause the nub 51 to travel along the slope 50 of the cylindrical sleeve 8. It is preferred that the sleeve 8 not completely encircle the tube 9, thus providing a channel 52, through which the nub 51 can pass to enable gross focus adjustment.

It is preferred that the eyepiece (not shown) at the top of the optical tube 9 be of 5× magnification.

The material from which the base 4 can be constructed is not particularly limited, but can preferably be selected based on factors such as the material's durability, strength, appearance, cost, weight, etc. The base 4 can constitute a single material or a plurality of materials. Examples of suitable materials for the base 4 include cast aluminum, cast iron, steel, plastic and wood, with cast aluminum being preferred. In certain embodiments, it is preferred to coat at least the bottom of the feet 5 of the base 4 with a non-abrasive substance to prevent them from scratching or otherwise damaging the surface of the specimen 2 during use. Such non-abrasive substances include, but are not limited to, rubber, silicon-based compounds and plastics, such as nylon and polytetrafluoroethylene.

Further details regarding the construction of the base 4, cylindrical sleeve 8 and optical tube 9 are provided in my prior U.S. patent applications Ser. Nos. 29/066,088; 60/037,045; and 08/663,498, now U.S. Pat. No. 5,268,033; and U.S. Pat. No. 5,071,241.

FIG. 1 depicts an upright beam 10 attached to the base 4 by threaded fastening means 11 inserted through two holes on the bottom half of the upright beam 10 and into the body 7 of the base 4. A portion of the upper half of the upright beam 10 has an upright beam slot 12 for receiving a threaded coupling rod 13 extending from a rotatable beam 14. The rotatable beam 14 has a rotatable beam slot 15 for receiving a fastener 16, which has a threaded portion (not shown) for screwing into a corresponding threaded socket (not shown) in the bottom of the image recording device 3.

The combination of the upright beam 10, rotatable beam 14, coupling rod 13, coupling rod nuts 17, coupling rod washers 18 and fastener 16 constitute an example of adjustable alignment means for aligning the respective optical axes of the image recording device 3 and the optical tube 9. By rotating the rotatable beam 14 about an axis perpendicular to the beams 10 and 14, which is defined by the coupling rod 13 (i.e., the rotatable beam 14 and the coupling rod 13 rotate as a single unit), the optical axis of the image recording device 3 can be adjusted arcuately from left to right and vice versa (from the perspective of an operator positioned behind the upright beam 10, facing the image recording device 3 depicted in FIG. 1—hereinafter, the x axis). By adjusting coupling rod nuts 17 and washers 18 on the threaded coupling rod 13, the optical axis of the image recording device 3 can be adjusted toward and away from the upright beam 10 (i.e., along the y axis). The image recording device 3 can be moved toward and away from the optical tube 9 (i.e., along the z axis) by, e.g., sliding the coupling rod 13 along the upright beam slot 12. The optical axis of the image recording device 3 can be further adjusted by sliding the fastener 16 along the rotatable beam slot 15. Thus, the mounting apparatus 1 adapts to receive a wide variety of image recording devices.

Examples of suitable materials for beams 10 and 14 include cast aluminum, cast iron, steel, plastic and wood, with cast aluminum being preferred.

Figure 2:
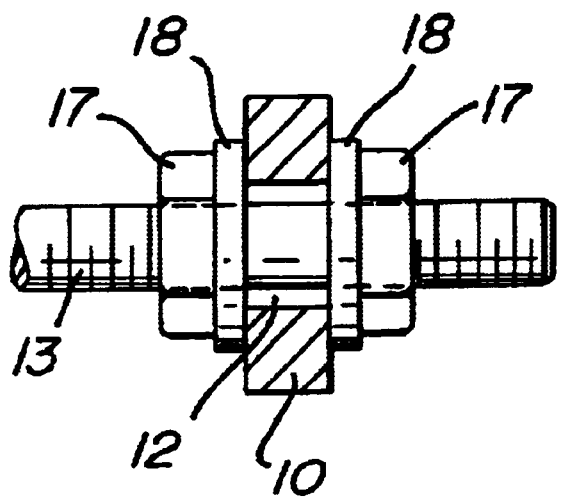
FIG. 2 is an overhead sectional view along line 2—2 of FIG. 1, showing details of a fastening means of the embodiment depicted in FIG. 1.

FIG. 2 is an overhead view through line 2—2 of FIG. 1, showing how the coupling rod nuts 17 and the coupling rod washers 18 tighten against the upright beam 10 to fix the position of the coupling rod 13 in the upright beam slot 12. The nuts 17 can be, e.g., standard hex nuts (as shown) or hand-tightened nuts.

The image recording device 3 is positioned on the mounting apparatus 1 such that its lens 24 contacts, or is closely adjacent to, a lens platform 25 surrounding (or perforated by) the uppermost end of the optical tube 9. The lens platform 25 is preferably made of, or coated with, non-abrasive material which readily conforms to the shape of the lens 24 and lens abutting portions of the image recording device 3. Preferably, the lens platform 25 hinders extraneous light from seeping through the seam formed between the lens and the lens platform 25. It is particularly preferred to cover the lens platform 25 with high-pile black felt.

FIG. 1 depicts a preferred embodiment including illumination devices 26 directed at an area of the specimen 2 being observed. The illumination devices 26 are attached to the base 4 by arms 27. The illumination devices 26 can be held by rigid arms, or by articulating arms, which would permit the direction of illumination to be altered. The design of the arms 27 is not particularly limited, and the arms 27 can be made of the same type of material as the base 4. However, it is preferred to use a malleable material, such as thin gauge aluminum, which permits the lights 26 to be moved as desired.

The types of illumination devices 26 which are suitable for use in the invention are not particularly limited. For example, the illumination device 26 can be as simple as a penlight having its own battery power, or as complex as a laser requiring external power means. In certain embodiments, more than one type of illumination device 26 can be accommodated by the arms 27, concurrently and/or sequentially. Thus, for example, it is contemplated that one arm can hold a laser for physically altering the specimen 2, while the other arm holds a lamp for illuminating the specimen 2. It is also contemplated that the arms 27 can be adapted to receive a variety of illumination devices having standard fittings, such as would be provided in the form of a kit.

Illumination devices which produce light of varying wavelengths, intensities and durations are suitable for use in the invention. For example, in certain embodiments, it is preferable to illuminate the specimen 2 with UV light (i.e., light having a wavelength of less than 4,000 Å), IR light (i.e., light having a wavelength of more than 7,000 Å) and/or visible light (i.e., light having a wavelength of 4,000–7,000 Å). Recording non-visible wavelengths, optionally applying to the specimen 2 appropriately selected marker compounds which have enhanced visibility at such wavelengths, can facilitate effectively analyzing the specimen 2.

The illumination device 26 can be a flash or strobe unit, capable of producing intense flashes of light singly or in rapid succession. The flash can preferably be triggered by the image recording device 3 by connecting the flash unit to a flash-controlling interface commonly included on image recording devices.

If the illumination device 26 is a strobe light capable of generating rapid series of intense flashes, the mounting apparatus 1 can be used in a method of producing slow-motion images without the need for expensive image recording devices. In an embodiment of the method, a conventional camcorder is mounted on the mounting apparatus, which is mounted on a specimen. The environment is darkened, and the camera and strobe light are actuated. The strobe enables a relatively simple camcorder to obtain high-definition slow-motion videotape.

The illumination device 26 can be a laser for enhanced viewing, marking, performing microscopic etching, surgery, etc.

Figure 4:
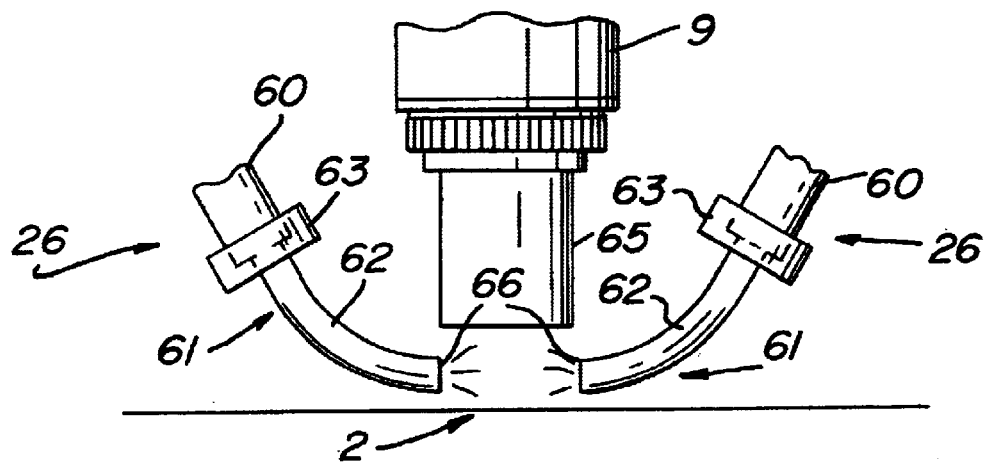
FIGS. 4 and 5 are enlarged views of a preferred illumination means of the invention.
Figure 5:
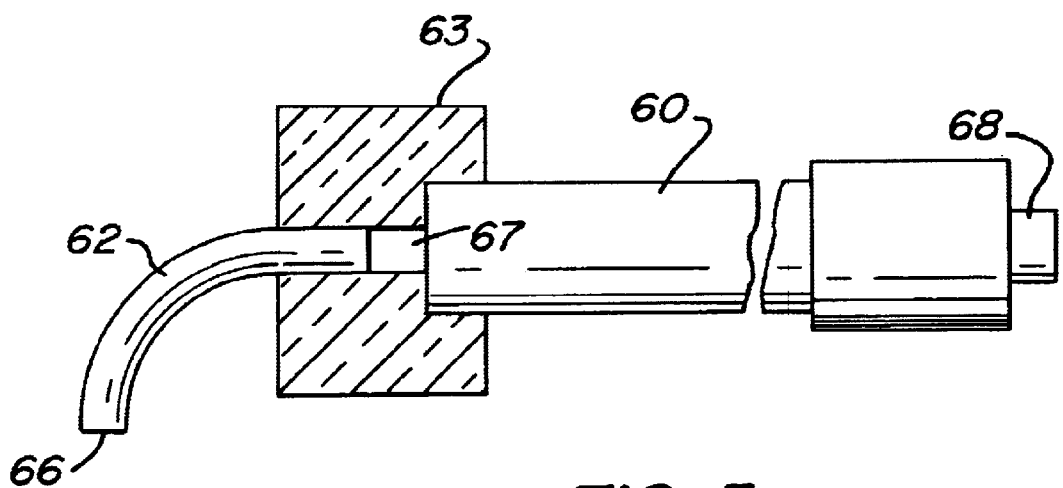

FIGS. 4 and 5 show a preferred embodiment of the illumination device 26, wherein pen lights 60 are fitted with a pinpoint illuminator attachment 61 comprising a clear, curved, preferably acrylic tube 62 attached at one end thereof to a preferably clear, preferably acrylic cap 63 adapted to receive the light emitting end of pen light 60. This embodiment of the, illumination device 26 is advantageously employed when the power and size of the objective lens 65 is sufficiently large to create shadows on the specimen if illuminated with a less focused illumination device or an illumination device unable to focus light on the specimen at a shallow angle, such as, for example, less than about 30 degrees.

Edge surface 66 of the tube 62 is matted or roughened, to thereby diffuse, i.e., even out, the light projected therethrough. For example, in accordance with one embodiment of this invention the edge surface 66 is lightly sanded to effect the matting thereof.

FIG. 5 shows an embodiment wherein the tube 62 is fixed in an intermediate position within bore 67 in cap 63. The tube 62 and cap 63 can be fixed together by a suitable solvent binder, such as methylene chloride. It should be understood that other binders may be usable in this invention, the important requirement being that the binder be compatible with the materials to be bonded together and be clear to permit light transmissions therethrough. It should also be understood that the method for producing the pinpoint illuminator attachment 61 is not limited to the foregoing. For example, the pinpoint illuminator attachment 61 can be a unitary molded structure instead of two bonded elements.

When the power switch 68 is activated, light flows through the tube 62, out of the edge surface 66 and on to the specimen without being impeded by the objective lens 65.

Various filters can be adapted for use with the illumination device. For example, a gel filter (not shown) designed to balance the light from penlight 60 can be inserted into the unfilled portion of bore 67 prior to inserting penlight 60 into cap 63.

While the invention has been described in detail and with reference to specific examples thereof, it will be apparent to one skilled in the art that various changes and modifications can be made therein without departing from the spirit and scope thereof.

What is claimed is:

1. A microscope comprising:

an optical tube for magnifying an image of a specimen to be viewed, said optical tube having an optical tube optical axis along which said optical tube is selectively moveable to alter said image; and an optical tube sleeve in which said optical tube is rotatably and slideably retained;

wherein the optical tube sleeve includes an upper sloping surface and said optical tube includes a radial projection for overlying and engaging said sloping surface whereby rotation imparted to the optical tube causes said optical tube to move axially along said optical tube optical axis through the cooperation of the sloping surface with the radial projection to make a fine focus adjustment, and wherein said optical tube sleeve only Partially encircles the optical tube and includes spaced-apart side edges defining a generally vertically oriented channel in said optical tube sleeve, said radial projection being dimensioned to slide within said channel along said optical tube optical axis when aligned therewith, whereby a gross focus adjustment can be made.

2. The microscope of claim 1, further comprising:

a lens platform for receiving a lens of an image recording device having an image recording device optical axis, said lens platform attached to an end of said optical tube furthest from said specimen;

a base for supporting said microscope and said image recording device on said specimen, said base being attached to said optical tube sleeve; and adjustable alignment means for selectively aligning said image recording device optical axis and said optical tube optical axis, said adjustable alignment means being attached to said base and removably attachable to said image recording device.

3. The microscope of claim 2, wherein said adjustable alignment means is attachable to said image recording device through a threaded mounting socket in said image recording device, and said microscope is configured to align said image recording device optical axis and said optical tube optical axis regardless of whether said threaded mounting socket is aligned with said image recording device optical axis.

4. The microscope of claim 3, wherein the adjustable alignment means is configured to permit said image recording device and said optical tube to move toward and away from said specimen without losing alignment of said optical axes.

5. The microscope of claim 3, wherein the adjustable alignment means comprises first and second beams joined by a coupling rod, said first beam being attached to said base and said second beam being removably attachable to said image recording device, wherein said second beam is rotatable about an axis perpendicular to said first and second beams and defined by said coupling rod, and said first and second beams maintain a spaced-apart parallel alignment throughout said rotation.

6. The microscope of claim 5, wherein the coupling rod is selectively rotatable in a perforation in at least one of said first and second beams.

7. The microscope of claim 6, wherein the coupling rod is slidable along a length of a slot in at least one of said first and second beams.

8. The microscope of claim 7, wherein a fastener threaded through a slot in said second beam screws into said threaded mounting socket.

9. The microscope claim 8, wherein the fastener is slidable along a length of said slot in said second beam.

10. The microscope of claim 2, wherein said base comprises rotating means for gliding on a surface of said specimen.

11. The microscope of claim 2, wherein said base comprises a magnet for removably attaching to a surface of said specimen.

12. The microscope of claim 2, wherein said base comprises a suction-cup for removably attaching to a surface of said specimen.

13. The microscope of claim 2, further comprising a lamp attached to said apparatus and directed toward said specimen.

14. The microscope of claim 13, wherein said lamp generates light having a wavelength 4000–7000 Å.

15. The microscope of claim 13, wherein said lamp generates light having a wavelength of less than 4000 Å.

16. The microscope of claim 13, wherein said lamp generates light having a wavelength of more than 7000 Å.

17. The microscope of claim 13, wherein said lamp is a strobe light.

18. The microscope of claim 13, wherein said lamp is a photographic flash unit which includes means for being controlled by said image recording device.

19. The microscope claim 2, further comprising a laser attached to said apparatus and directed toward said specimen.

20. The microscope of claim 2, further comprising a penlight attached to said apparatus and directed toward said specimen, and a curved pinpoint illumination attachment attached to said penlight, wherein said attachment is adapted to redirect and focus a beam from said penlight on said specimen.

21. A method for recording a microscopic image of a specimen, said method comprising:
    providing a microscope according to claim 2;
    mounting an image recording device in said microscope;
    mounting said microscope on said specimen; and
    actuating said image recording device to record said microscopic image of said specimen.

22. The method of claim 21, wherein said image recording device is a motion picture recording device and a strobe light is actuated during said recording to produce a slow-motion microscopic motion picture.

23. A method for viewing a microscopic image of a specimen, said method comprising:
    providing a microscope according to claim 2;
    mounting an image recording device in said microscope;
    mounting said microscope on said specimen; and
    actuating said image recording device to display on a viewing screen said microscopic image of said specimen.

24. The microscope of claim 1, wherein said radial projection is in the form of a rivet.

25. The microscope of claim 1, wherein the upper sloping surface slopes generally downwardly in a direction toward said channel.

* * * * *